Figure 1:
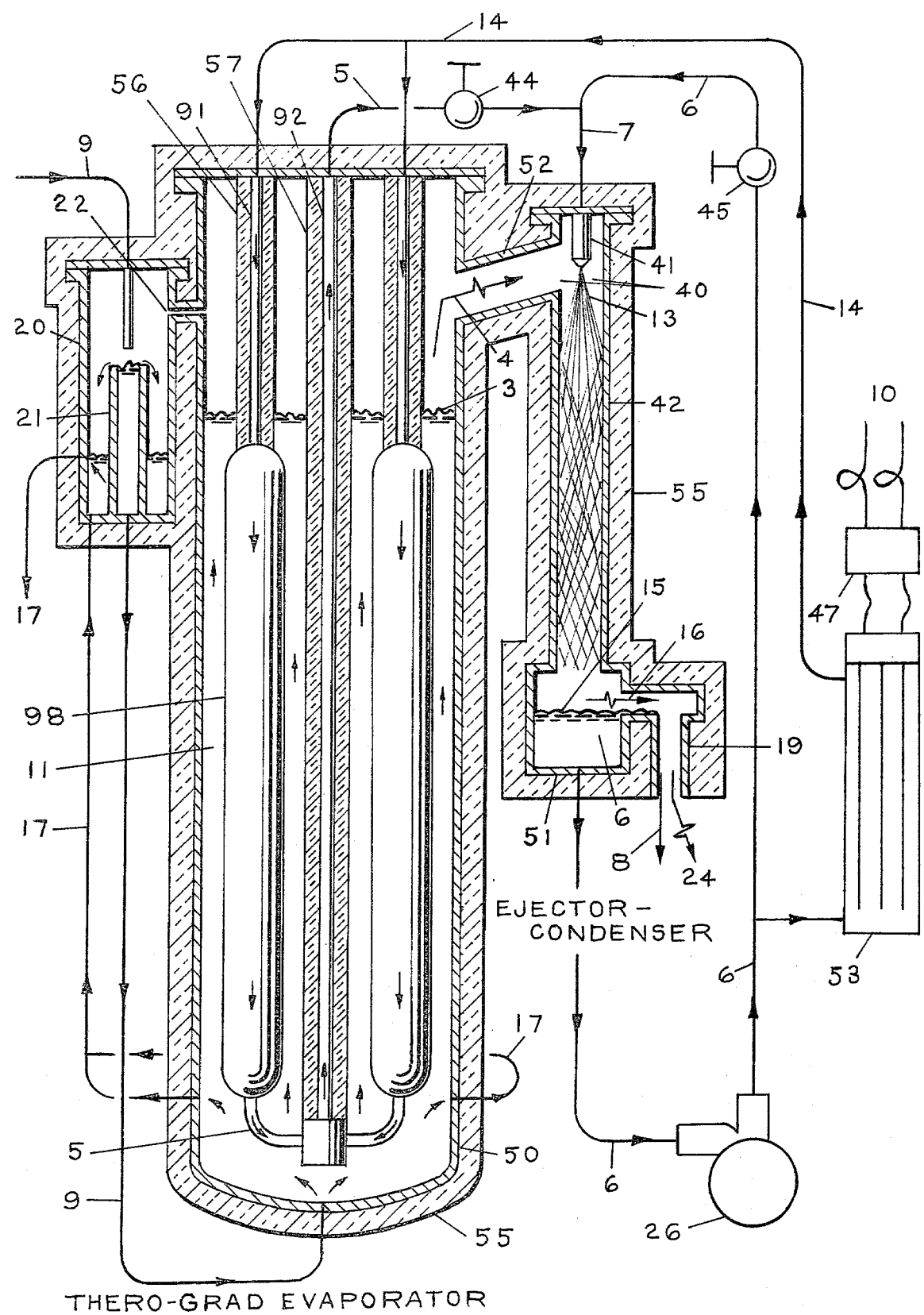

United States Patent [19]

Sundquist

[11] 4,309,243
[45] Jan. 5, 1982

[54] VERTICAL TUBE DISTILLERS

[76] Inventor: Charles T. Sundquist, 1971 Sheridan Pl., Richland, Wash. 99352

[21] Appl. No.: 156,734

[22] Filed: Jun. 5, 1980

[51] Int. Cl.³ .............................................. B01D 1/00
[52] U.S. Cl. .............................. 159/24 B; 159/28 B; 202/185 A; 202/235; 203/26
[58] Field of Search ................. 159/28 R, 28 B, 28 C, 159/28 D, 23, 24 B, 24 R; 202/185 A, 235, 205; 203/26, 24

[56] References Cited

U.S. PATENT DOCUMENTS

| | | | |
|---|---|---|---|
| 849,579 | 4/1907 | Siebel | 159/24 B |
| 3,288,685 | 11/1966 | Kemper et al. | 159/24 B |
| 3,674,652 | 7/1972 | Brown | 203/26 |
| 3,856,632 | 12/1974 | Peter | 159/24 B |
| 3,925,149 | 12/1975 | Erwin | 159/28 R |
| 4,023,946 | 5/1977 | Schwartzman | 203/26 |

*Primary Examiner*—Norman Yudkoff

[57] ABSTRACT

In a new type of evaporator both a stream of cooling liquid and vapor are produced simultaneously. The cooling liquid is then used to compress and condense the vapor in an ejector-condenser. Heat of vaporization is recaptured in the ejector-condenser and recycled back to the evaporator, thus leading to high thermal efficiency.

9 Claims, 1 Drawing Figure

THERO-GRAD EVAPORATOR

VERTICAL TUBE DISTILLERS

This application is copending with application Ser. No. 06/080.176 filed 10/01/79 which is similar.

This invention is an improvement to the distillation process claimed in U.S. Pat. Nos. 3,444,050 granted May 13, 1969, and U.S. Pat. No. 3,736,235 granted May 29, 1973, and U.S. Pat. No. 4,159,227 granted June 26, 1979. The distiller is now much simpler. One pump is used instead of several. Most control instrumentation has been eliminated, the distiller now being essentially self-controlling. An important new element is an ejector-condenser.

An object of the invention is to distill liquids such as water with low energy input.

An object of the invention is to fractionally distill liquid solutions such as alcohol and water with low energy input.

An object of the invention is to concentrate contaminated solution at low energy input with minimum chance of spreading contamination.

This invention is a combination of a different type of vertical tube evaporator and an ejector-condenser along with a pump and liquid heater. It's operation has been tested in a bench model of the distiller.

Referring to FIG. 1, the vertical tube evaporator is composed of evaporator vessel 50 with upright heating tubes 98. Heating fluid 14 flows downward through feeder tubes 91 to heating tubes 98. Feeder tube insulation 56 prevents loss of heat to vapor 4. Liquid-vapor interface 3 lies above the tops of heating tubes 98. Vapor 4 separates from liquid-vapor interface 3 and passes from evaporator vessel 50 into vapor duct 52. Feed solution 9 enters the bottom of evaporator vessel 50. Return solution 17 exits from side of evaporator vessel 50. Cooled heating fluid 5, from the bottoms of heating tubes 98, is collected in return tube 92 and carried upward and out of evaporator vessel 50. Return tube insulation 57 prevents reheating of cooled heating fluid 5.

It is common knowledge that, in a closed vessel of static warm water, the water near the top will be warmer than that near the bottom. Something like this occurs in a vertical tube evaporator. Here, however, the temperature stratification occurs under dynamic conditions where heat is being transferred into and out of the solution.

Referring to FIG. 1, heat transfer from inside to outside of heater tubes 98 is by natural convection. Most of the transferred heat goes upward to liquid-vapor interface 3 where it is carried off at latent heat of vaporization in vapor 4. A small portion of this transferred heat is lost by transmission through evaporator vessel 50 walls and vessel insulation 55. Heat is also lost to return solution 17 which leaves at a temperature above that of feed solution 9.

Tests on a bench model of the process prove that solution 11 temperatures in the bottom of the vertical tube evaporator stabilize well below vapor 4 temperature. With tap water for solution 11, cooled heating fluid 5 stabilized 10 F. to 30 F. lower than vapor 4, depending on the flow rate of heating fluid 14. This occured even when the flow of return solution 17 was zero.

Vapor 4 leaves the evaporator through vapor duct 52 and enters an ejector-condenser consisting of intake manifold 40, nozzle 41, propellant spray 13, diffuser duct 42 and condenser sump 51. The ejector-condenser pumps and condenses vapor 4 to form hot distillate 6 in condenser sump 51. As distillate 6 accumulates, vapor-liquid interface 15 tends to rise. Spill tube 19 provides an overflow outlet where hot distillate 6 can spill downward and out of condenser sump 51 to become product distillate 8. Vapor 16, also, can also flow freely to atmosphere through spill tube 19.

Pressurized fluid 7 is a mixture of cooled heating fluid 5 and hot distillate 6. The temperature of the resulting spray 13 is lower than that of vapor 4 and this temperature difference contributes to condensation. Condensation of vapor 4 is also promoted by its compression in the ejector-condenser. Vapor 4 is a few inches water gage pressure lower than vapor 16 which is at atmospheric pressure. In FIG. 1 diffuser duct 42 is shown as a straight tube. A convergent-divergent tube could also be used, possibly with greater effectiveness.

Hot distillate 6 flows from condenser sump 51 to the inlet of distillate pump 26. From distillate pump 26, hot distillate 6 flows to nozzle 41 by two different routes. One route is through throttle valve 45 directly to nozzle 41. The other route is through distillate heater 53, through the vertical tube evaporator, through throttle valve 44 and thence to nozzle 41. The object of this divided flow is to provide means for adjusting the temperature of heating fluid 14 to approximately 50 F. to 80 F. higher than vapor 4 without interfering with the rate at which heat input energy 10 enters the process.

Process heat-up takes several hours. Distillate heater 53 is operated at full heat energy input and the vertical tube evaporator is heated from the top down. The end of heat-up approaches when the temperature of vapor 4 peaks. Heat-up is complete when a little later the temperature of hot distillate 6 in condenser sump 51 peaks. At this point, vapor 24 begins to flow vigorously from the bottom of spill tube 19.

All of solution 11 is now in vigorous agitation. This activity is driven by tiny rapidly rotating heat transfer cells on the surface of heating tubes 98. Secondary, tertiary, etc cells keep all of solution 11 in motion.

Vapor 4 production is independent of heat energy input 10. Increasing or decreasing heat energy input 10, instead, determines how much of vapor 4 ends up at the bottom of spill tube 19 as product distillate 8 and how much as vapor 24. Decreasing heat energy input 10 increase the product distillate 8 portion and visa versa.

To achieve high thermal efficiency, the flow of vapor 24 from spill tube 19 should be small. This is done by using input energy modulator 47 to regulate heat energy input 10 so that just a small amount of vapor 24 flows from spill tube 19. In this way almost 100% of the latent heat of vaporization in vapor 16 is recycled to heating tubes 98. The small flow of vapor 24 insures that non-condensible gases are continuously purged from the distiller and vapor 4 in the vertical tube evaporator and vapor 16 in condenser sump 51 are as pure as possible. The presence of non-condensible gases in the distiller interfers with the smooth flow of vapor from liquid-vapor interface 3 to vapor-liquid interface 5.

Head box 20 is a means of regulating the flow of feed solution 9 into the bottom of the vertical tube evaporator. The hydraulic head between the top of standpipe 21 and the outlet of return solution 17 from head box 20 determine the flow rate of feed solution 9 and return solution 17. The gas space in head box 20 is connected through cross vent 22 to the vapor space in evaporator 50 to regulate the elevation of liquid-vapor interface 3.

Other means of regulating the flow of feed solution 9 and the level of liquid-vapor interface 3 could also be used.

The bench model previously mentioned was also used to make preliminary tests on the fractional distillation of ethyl alcohol from water. Solution 11 and feed solution 9 were initially 20 proof. All of the rest of the model was filled with 180 proof ethyl alcohol. Peak temperatures were as follows:

|  | vapor 4 | condenser sump 51 |
|---|---|---|
| tap water | 212F | 212F |
| ethyl alcohol | 200F | 173F |

The production rate of product distillate 8 was about twice as much for ethyl alcohol as for distilled water.

In concentrating contaminated feed solution, the distiller has several advantages. Exterior connections for cooling water are not required, eliminating one way of spreading contamination. Contamination is confined to solution 11 in the vertical tube evaporator. The other equipment, including distillate pump 26, operates on decontaminated distillate and can be worked on with less chance of contamination spread. Also, small leaks in heating tubes 98 result in decontaminated distillate mixing into contaminated solution 11 instead of visa-versa.

The inventor claims:

1. A distiller including the following: a vertical tube evaporator consisting of a closed evaporator vessel containing an upright heating tube, heating fluid flowing downward inside said heating tube, cooled heating fluid exiting from the bottom of said heating tube, solution in the shell space surrounding said heating tube, feed solution flowing into said shell space, a liquid-vapor interface above said heating tube, a vapor outlet in said evaporator vessel, vapor exiting from said vapor outlet; an ejector-condenser consisting of an intake manifold, a nozzle, a diffuser duct, and a condenser sump with a vapor outlet; said vapor from said evaporator vessel entering said intake manifold; propellant spray from said nozzle containing some of said cooled heating fluid; said propellant spray in combination with said diffuser duct condensing said vapor from said evaporator vessel; hot distillate collecting in said condenser sump; a distillate pump drawing suction from said hot distillate in said condenser sump; some of hot distillate, discharging from said distillate pump, passing through a distillate heater and exiting as said heating fluid; said heating fluid from said distillate heater entering the top of said heating tube.

2. A distiller as in claim 1 including an insulated feeder tube conducting said heating fluid to the top of said heating tube.

3. A distiller as in claim 1 wherein said condenser sump vapor outlet is also an overflow outlet for product distillate.

4. A distiller as in claim 1 including two flow routes whereby said hot distillate flows from said distillate pump to said nozzle, one route being through said distillate heater and the other route by-passing said distillate heater.

5. A distiller as in claim 1 wherein said propellant spray in combination with said diffuser duct compresses said vapor from said evaporator vessel.

6. A distiller as in claim 1 wherein said cooled heating fluid exiting from the bottom of said heating tube is at a lower temperature than said vapor exiting from said vapor outlet in said evaporator vessel.

7. A distiller as in claim 1 including head box means for regulating the flow of said feed solution into said evaporator vessel.

8. A distiller as in claim 1 including head box means for regulating the flow of return solution from said evaporator vessel.

9. A distiller as in claim 1 wherein said heating tube is suspended from a cover flange mounted on said evaporator vessel and an insulated return tube conducts said cooled heating fluid to said cover flange.

* * * * *